United States Patent [19]

Fujimura et al.

[11] Patent Number: 4,495,922
[45] Date of Patent: Jan. 29, 1985

[54] AIR/FUEL RATIO CONTROL SYSTEM FOR AN INTERNAL COMBUSTION ENGINE

[75] Inventors: Akira Fujimura, Saitama; Shunzaburo Ozaki, Sakado, both of Japan

[73] Assignee: Honda Giken Kogyo Kabushiki Kaisha, Tokyo, Japan

[21] Appl. No.: 576,833

[22] Filed: Feb. 3, 1984

[30] Foreign Application Priority Data

Feb. 10, 1983 [JP] Japan .................. 58-21145

[51] Int. Cl.³ ............................. F02M 23/04
[52] U.S. Cl. ................... 123/440; 123/587; 123/589
[58] Field of Search ............... 123/438, 449, 585, 587, 123/589

[56] References Cited

U.S. PATENT DOCUMENTS

| | | | |
|---|---|---|---|
| 4,083,341 | 4/1978 | Brettschneider et al. | 123/589 |
| 4,091,783 | 5/1978 | Laprade et al. | 123/589 |
| 4,192,140 | 3/1980 | Yamashita et al. | 123/589 |
| 4,335,699 | 6/1982 | Totsune et al. | 123/587 |
| 4,436,070 | 3/1984 | Akagi et al. | 123/589 |
| 4,449,502 | 5/1984 | Furuhashi | 123/589 |

Primary Examiner—William A. Cuchlinski, Jr.
Attorney, Agent, or Firm—Pollock, Vande Sande and Priddy

[57] ABSTRACT

An air/fuel ratio control system for an internal combustion engine having an air induction system equipped with a secondary air passage communicated with an air intake passage and an oxygen sensor disposed in an exhaust system of the engine, the flow of the secondary air through the secondary air passage being controlled in accordance with a feedback control signal based on an output signal of the oxygen sensor, comprises a temperature sensor for sensing the temperature of the intake air supplied to the engine, and a control means for preventing the supply of the secondary air when the intake air temperature detected by the temperature sensor is below a predetermined level. The start timing of the feedback air/fuel ratio control is thus determined in accordance with the intake air temperature, to alleviate the drawbacks of the conventional air/fuel ratio control system in which the start timing of the feedback control is determined in accordance with the engine coolant temperature.

2 Claims, 8 Drawing Figures

AIR/FUEL RATIO CONTROL SYSTEM FOR AN INTERNAL COMBUSTION ENGINE

BACKGROUND OF THE INVENTION

1. Field of the Invention

The present invention relates to an air/fuel ratio control system for an internal combustion engine, and more particularly to a feedback air/fuel ratio control system for an internal combustion engine equiped with a secondary air supply passage in the air induction system.

2. Description of Background Information

The feedback air/fuel ratio control system is used in an internal combustion engine for the purpose of the emission control, and in which the air/fuel ratio of the mixture to be supplied to the engine is controlled to the stoichiometric value according to an output signal level of an oxygen sensor disposed in the exhaust system of the engine.

As a type of the above mentioned air/fuel ratio control system having an air induction side secondary air supply device, the present applicant has proposed a feedback air/fuel ratio control system in which the air flow through the secondary air supply passage communicated with the downstream of the throttle valve is controlled by an electro-magnetic valve which is open/close controlled in response to an output signal of the oxygen sensor, and the secondary air supply passage is provided with a vacuum responsive type air control valve for controlling the amount of the secondary air, which air control valve is applied with a control vacuum obtained by combining the vacuum of the vicinity or the downstream of the throttle valve and the so called venturi vacuum, i.e., the vacuum of the inside of the venturi.

On the other hand, in the case of the conventional air/fuel ratio control system, the system is designed to start the feedback control when a detected value of the engine coolant temperature has risen above a predetermined level. When the engine coolant temperature is below the predetermined level, the system is operated under an open loop control mode which provides an air/fuel ratio other than the stoichiometric air/fuel ratio. This is because during a period after a cold start of the engine in which the temperature of the engine coolant is low, the frictional resistance in the engine is relatively large and the atomization of the fuel is not sufficient and also the oxygen sensor remains inactivated during this period.

In addition, the air/fuel ratio of the mixture supplied to the engine cylinders is considered to be a function of the density of the intake air. Therefore, when the temperature of the intake air is low, the air/fuel ratio becomes leaner due to the density of the intake air which is greater than that in the period of normal engine operation. Therefore, during the open loop control mode after the cold engine starting, the air/fuel ratio of the mixture is shifted to the rich side so as to stabilize the engine operation.

However, in the case of the conventional system in which the start timing of the feedback control is determined in accordance with the engine coolant temperature, the drawback was that the start timing of the feedback control is sometimes improper because the intake air temperature may remain low even if the engine coolant temperature has reached the first predetermined level, or because it may take a long time to raise the engine coolant temperature to a second predetermined level higher than said first predetermined level.

SUMMARY OF THE INVENTION

An object of the present invention is therefore to provide an air/fuel ratio control system of the air intake side secondary air supply system type in which the start timing of the feedback control is determined in accordance with the detected value of the intake air temperature.

According to the present invention, the air/fuel ratio control system is constructed to prevent the feedback control of the air/fuel ratio by closing the secondary air supply passage when the detected value of the intake air temperature is lower than the predetermined temperature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention, both as to its organization and manner of operation, together with further objects and advantages thereof, may best be understood by reference to the following description taken in connection with the accompanying drawings, in which.

DETAILED DESCRIPTION OF THE PREFERRED EMBODIMENTS

Figure 1:
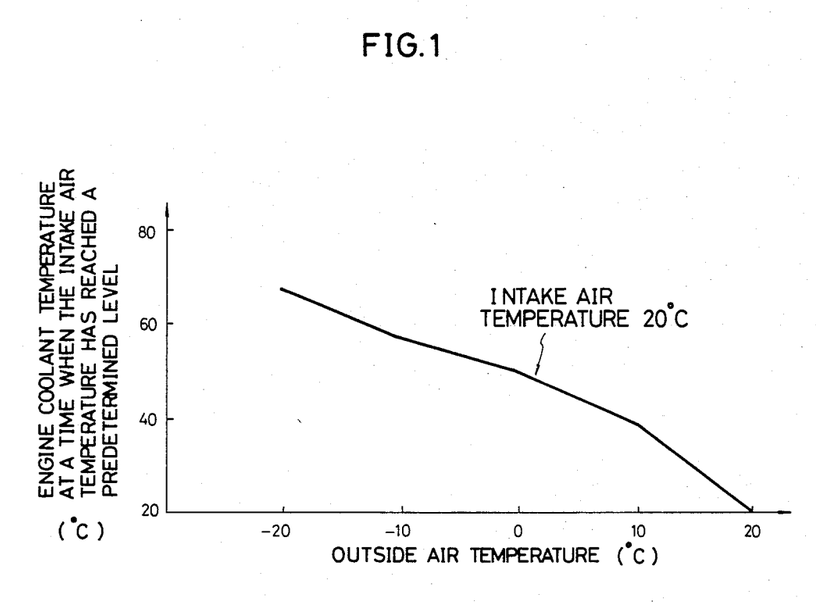
FIG. 1 is a temperature characteristc curve showing the engine coolant temperature relative to the outside air temperature at a parameter of the intake air temperature of 20° C.

Before entering into the explanation of a preferred embodiment of air/fuel ratio control system of the present invention, the problem of the prior art technique will be again explained more particularly with reference to FIG. 1.

In FIG. 1, there is illustrated a variation of the engine coolant temperature relative to the temperature of outside air, attained when the temperature of the intake air in the air cleaner case, between a hot air control valve and an air cleaner element, has reached a predetermined temperature (20° C., for example).

When the intake air temperature has the value around 20° C., the required value of the air/fuel ratio lies between 14 and 14.7, and it is desirable to start the feedback control under this condition, for operating the engine with a stability and for improving the emission control efficiency.

On the other hand, since the engine coolant temperature varies independently of the intake air temperature, the value of intake air temperature when the engine coolant temperature has risen up to a specific value, varies significantly with the outside air temperature. Therefore, in the prior art air/fuel ratio control system in which the feedback air/fuel ratio control is started when the engine coolant temperature has reached for example the value of 40° C., the outside air temperature may possibly be as low as −20° C. at the time of the beginning of the air/fuel ratio control. In such a case, the fuel metering system is controlled to provide the stoichiometiric air/fuel ratio in accordance with the feedback control, however the mixture tends to get leaner than the required value due to the low temperature of the intake air, thus resulting in poor engine operation.

On the other hand, in a case where the system is designed to start the closed loop control when the engine coolant temperature has reached the value of 70° C., it is inconvenient that the time period required for raising the engine coolant temperature upto 70° C. is longer than the time period in which the intake air temperature reaches 20° C., for instance. In other words, the engine operates without feedback control for a long time after starting, which also results in a problem of poor emission control.

Therefore, it is considered suitable to determine the start timing of the closed loop control in accordance with the intake air temperature rather than the conventional determination in accordance with the engine coolant temperature.

In addition, if the internal combustion engine is equipped with an air/fuel ratio control system of the above mentioned type of the intake side secondary air induction, with a choke valve opening and closing of which is automatically controlled in accordance with the intake air temperature, the opening angle of the choke valve may possibly remain by far lower than the desired opening angle due to a low temperature value of the intake air, when the engine coolant temperature has reached a level at which the feedback control of the air/fuel ratio is to be started. In such a condition, the venturi vacuum becomes very high and the control vacuum in the air/fuel ratio control system also becomes high, which opens the air control valve widely, resulting in an over lean air/fuel ratio.

This problem will be explained more concretely hereinafter.

In the following description, it is assumed that the control system is designed to start the feedback control when the engine coolant temperature has attained the value of 40° C. According to the temperature characteristic curve of FIG. 1, if the outside air temperature is 10° C., the intake air temperature is obviously over 20° C. when the engine coolant temperature has reached 40° C. Since the choke valve is designed to open at angle of 45° when the intake air temperature is 20° C., the venturi vacuum does not increase exceedingly at this opening angle of the choke valve. However, if the outside air temperature is below 10° C. and the intake air temperature has not reached 20° C. when the engine coolant temperature has reached 40° C., the venturi vacuum becomes exceedingly high because the opening angle of the choke valve is smaller than 45°. On the other hand, if the system is designed to start the feedback control when the engine coolant temperature has reached 70° C., the venturi vacuum does not increase exceedingly because the opening angle of the choke valve is sufficiently large when the air/fuel feedback control is started at which the intake air temperature has reached 20° C. even if the outside air temperature is as low as −20° C. However, as mentioned above, there is a drawback that a longer period is required to raise the engine coolant temperature to 70° C. than to raise the intake air temperature to 20° C. Thus, this type of control is not practical because the feedback control does not start for a long period after the engine starting until the time when the engine coolant temperature has reached 70° C.

Referring to FIGS. 2 to 6, preferred embodiments of the air/fuel control system according to the present invention will be explained in detail hereinafter.

Figure 2:
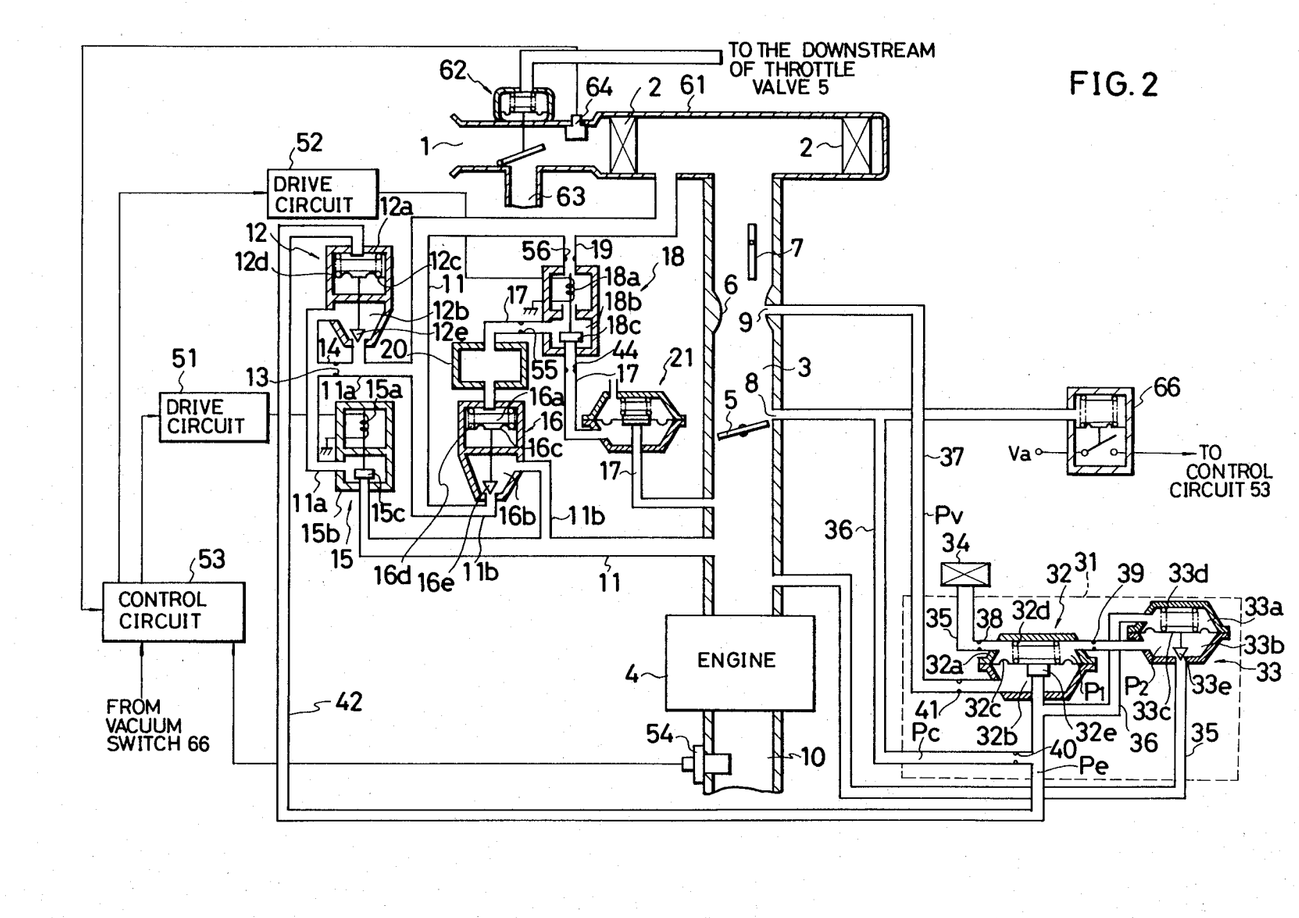
FIG. 2 is a schematic diagram of the air/fuel ratio control system of the air intake side secondary air supply system type according to the present invention.

In the air/fuel control system illustrated in the schmatic diagram of FIG. 2, intake air taken from an air inlet port 1 is supplied to an internal combustion engine 4 via an air cleaner 2 and intake air passage 3. In the intake air passage 3, a throttle valve 5 is provided in the middle. Further, a venturi 6 is formed upstream from the throttle valve 5 and a choke valve is disposed upstream of venturi 6. In the wall surface of the intake air passage 3, in proximity to the position of the throttle valve 5, a vacuum detection hole 8 is provided in such a manner that the vacuum detection hole 8 is located upstream from the throttle valve 5 when the throttle valve 5 is closed, and located downstream from the throttle valve 5 when the throttle valve 5 is opened. A second vacuum detection hole 9 is also provided to the venturi 6. In an air cleaner case 61, in proximity to the outside air inlet port 1, there is provided a hot air control valve 62 which, in accordance with the intake air temperature, provides a communication of the inner part of the air cleaner case 61 with a intake air passage 63 from an exhaust manifold cover (not shown).

Further, between the hot air control valve 62 and the air cleaner element 2, there is provided a intake air temperature sensor 64 consisting of a bimetal switch, for example.

A portion of the air induction system downstream of the throttle valve 5, i.e., the intake manifold is communicated with a portion around an air outlet port of the air cleaner 2 via an air intake side secondary air passage 11. In the middle of the secondary air passage, two air control passages 11a and 11b are connected so that the flow of the secondary air is divided into two flows. In the air control passage 11a, there is provided an air control valve 12 which consists of a vacuum chamber 12a, a valve chamber 12b acting as a part of the air control passage 11a, a diaphragm 12c defining a wall of the vacuum chamber 12a, and a needle-type valve 12e placed in the valve chamber 12b and applied with a biasing force of a valve spring 12d via the diaphragm 12c so as to close the air control passage 11a. With this construction, the cross sectional area of the air control passage 11a is increased as the magnitude of the vacuum acting upon the vacuum chamber 12a increases. Further, an air compensation passage 14 having an orifice 13 for an idle compensation is provided so as to bypass the air control valve 12. In the air control passage 11a, downstream from the air control valve 12, there is provided an electro-magnetic valve 15 which consists of a soleniod 15a, valve chamber 15b forming a part of the air control passage 11a, and a valve element 15c placed in the valve chamber 15b and electro-magnetically coupled with the solenoid 15a. When the soleniod is energized, the communication through the air control passage 11a is provided.

Then, the construction of a vacuum control part 31 which regulates the vacuum applied to the vacuum chamber 12a of the air control valve 12 will be explained hereafter. The vacuum control part 31 is provided with a regulator valve 32 and an air valve 33 which consist of a vacuum chamber 32a or 33a, a diaphragm 32c or 33c, a valve spring 32d or 33d, and a valve element 32e or 33e respectively. The vacuum chamber 32a is disposed midway of a control air passage 35 which leads from an atmospheric air inlet port 34 with a filter to a part of the intake air passage downstream of the throttle valve 5, and the valve chamber 33b is disposed in the control air passage 35 downstream of the vacuum chamber 32a. The valve element 33e is applied with a resilient force of the valve spring 33d via the diaphragm 33c so as to close the control air passage 35. The vacuum chamber 33a is communicated with the vacuum detection hole 8 via a vacuum passage 36, and similarly, the valve chamber 32b is communicated with the vacuum detection hole 9 via a vacuum passage 37. The valve chamber 32b is communicated with the vacuum passage 36 and the valve element 32e is applied with a resilient force of the valve spring 32d via the diaphragm 32c so that the communication between the valve chamber 32b and the vacuum passage 36 is closed by the valve element 32e. In addition, in the control air passage 35, a pair of orifices 38 and 39 are provided respectively upstream and downstream of the vacuum chamber 32a. Further, orifices 40 and 41 are provided in the vacuum passage 36 and the vacuum passage 37 respectively.

A part of the vacuum passage 36 of the side of the valve chamber 32b and the vacuum chamber 33a from the orifice 40, is communicated with the vacuum chamber 12a via a vacuum supply passage 42.

On the other hand, in the air control passage 11b, there is provided an air control valve 16 which is constructed in the same way as the air control valve 12, and consisting of a vacuum chamber 16a valve chamber 16b, a diaphragm 16c, a valve spring 16d and a needle type valve element 16e. With this construction, the cross sectional area of the air control passage 11b is increased as the magnitude of the vacuum acting upon the vacuum chamber 16a increases. Further, the vacuum chamber 16a is communicated with a part of the intake air passage downstream of the throttle valve 5 via a vacuum supply passage 17.

In the vacuum supply passage 17, there is provided an electro-magnetic valve 18 which consists of a solenoid 18a, a valve chamber 18b forming a part of the vacuum supply passage 17, a valve element 18c placed in the valve chamber 18b and electro-magnetically coupled with the soleniod 18a. The valve chamber 18b is communicated with a part of the secondary air passage 11 upstream from the air control valves 12 and 16 via an atmospheric pressure passage 19. When the soleniod 18a is not energyzed, the vacuum supply passage 17 is closed and a part of the vacuum supply passage of the side of the vacuum chamber 16a is communicated with the atmospheric pressure supply passage 19 via the valve chamber 18b. In addition, a pair of orifices 44 and 55 are provided in the vacuum supply passage 17 on both sides of the electro-magnetic valve 18, and an orifice 56 is provided in the atmospheric pressure supply passage 19. In the vacuum supply passage 17, on the side of the vacuum chamber 16a from the electro-magnetic valve 18, there is provided a surge tank 20 and a constant vacuum control valve 21 is provided between the electro-magnetic valve 18 and downstream of the throttle valve 5. The constant vacuum control valve 21 has a function to stabilize the vacuum pressure downstream of the throttle valve 5 to a predetermined vacuum level Pr when this vacuum pressure is above the predetermined value.

The soleniods 15a and 18a are connected, via drive circuits 51 and 52 respectively, to a control circuit 53 consisting of a microcomputer. The control circuit 53 receives signals from an intake air temperature sensor 64 and an oxygen sensor 54 which is disposed in an exhaust pipe 10 of the engine 4 to produce a voltage signal indicative of the oxygen contents in the exhaust gas of the engine.

The operation of the thus constructed air/fuel ratio control system will be explained hereinafter.

The operation of the vacuum control part 31 is as follows. When a vacuum Pc from the vacuum detection hole 8 is applied to the vacuum chamber 33a via the vacuum passage 36, in accordance with the operation of the engine, the valve element 33e is displaced in a direction to open the valve 33 if the vacuum pressure is greater than the resilient force of the valve spring. By the opening of the air valve 33, outside air from the atmospheric air inlet port 34 is introduced to the intake air passage 3 at the downstream of the throttle valve 5, via the control air passage 35. The vacuum P1 and the vacuum P2 respectively in the vacuum chamber 32a and the valve chamber 33b through which the outside air travels, is determined in accordance with the throttling ratio of the orifices 38 and 39 respectively.

In this condition, if the pressure difference between the vacuum Pv from the vacuum detection hole 9, acting in the valve chamber 32b and the vacuum P1 is greater than the resilient force of the valve spring 32d, the valve element 32e is displaced in the direction to open the valve 32. By this opening of the control valve 32, a part of the vacuum Pv is directed to dilute the vacuum past the orifice 40 to produce a vacuum Pe acting in the vacuum chamber 33a.

Subsequently, due to the down of the vacuum Pe, the opening angle of the air valve 33 is decreased to reduce the amount of the air flowing through the control air passage 35. By this reduction in the air flow amount, the vacuum P1 in the vacuum chamber 32a is reduced to close the control valve 32. Then the Pe is raised once more and the above sequential operations will be repeated. It is to be noted that the ratio between the vacuum Pv and the vacuum Pe becomes equal to the ratio between the vacuum P1 and the vacuum P2, since the speed of these repeating operations is very fast.

Therefore, when the amount of the main intake air of the engine is relatively small in which the vacuum P1 is greater than Pv, the opening degree of the regulation valve 32 becomes large and the vacuum Pe becomes low. On the other hand, as the amount of the main intake air increases, the opening angle of the regulation valve 32 becomes smaller since the vacuum Pv increases, and consequently the vacuum Pe becomes high. Since the vacuum Pe acts in the vacuum chamber 12a as well as in the vacuum chamber 33a, the amount of the air flowing through the control air passage 35 becomes proportional to the amount of the secondary air which flows through the air control passage 11a when the electro-magnetic valve 15a is opened. Similarly, the amount of the main intake air to the engine 4 becomes proportional to the amount of the secondary air flowing through the air control passage 11a by the opening of the air control valve 12. As a result, the vacuum Pe will have a value proportional to the amount of the main intake air to the engine.

Figure 3:
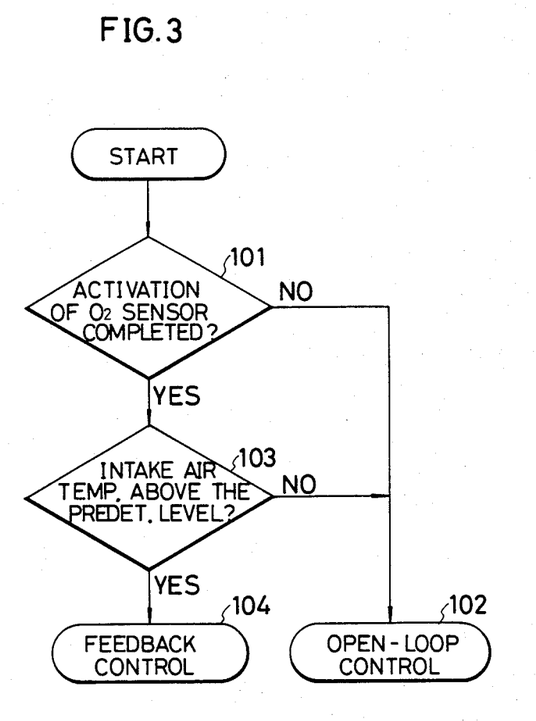
FIGS. 3 and 4 are flowcharts showing the operations of the control circuit provided in the air/fuel ratio control system of FIG. 2.
Figure 4:
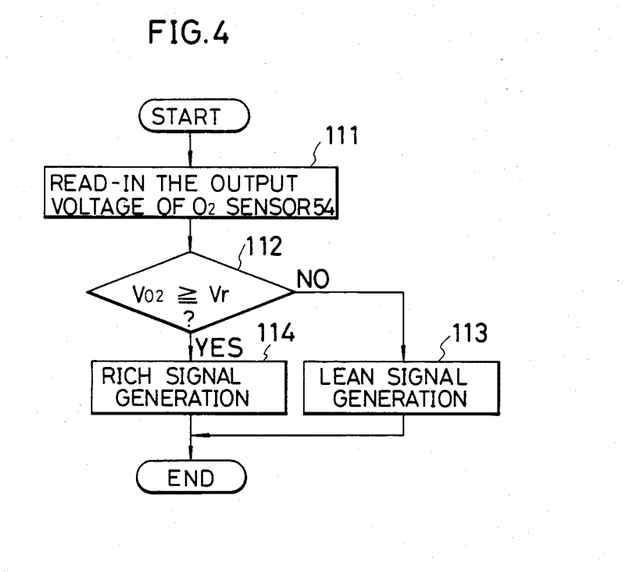

The operation of the control circuit 53 will be then explained with reference to the flowchart of FIGS. 3 and 4.

When an ignition switch (not shown) is turned on and a power current is supplied to the control circuit 53, firstly it determines, at a step 101, whether or not the activation of the oxygen sensor 54 has completed, by detecting the output voltage of the latter. Since the oxygen sensor 54 is of the so-called flow-out type, the output voltage $VO_2$ thereof increases as the ambient condition becomes rich. In the case of cold starting, the fuel metering system is operated by the open loop control so that the air/fuel ratio is controlled to the rich side, and the oxygen sensor is therefore, placed in the rich atmosphere.

Since the oxygen sensor 54 is of the flow-out type, the output voltage $VO_2$ is below the activation detection voltage Vx, if the sensor is under the inactivated condition. Therefore, if $VO_2 < Vx$, the control circuit 53 determines that the oxygen sensor 54 is not activated, and selects, at a step 102, the open loop control of the air/fuel ratio.

On the other hand, if $VO_2 \geq Vx$, the control circuit 53 determines that the activation of the oxygen sensor 54 is completed, and whether or not the intake air temperature is above a predetermined level, by means of the output voltage of the intake air temperature sensor 64, at a step 103. The intake air temperature sensor 64 is constructed such that when the intake air temperature is above the predetermined level, a bimetal switch incorporated therein is turned on, to shift the output signal from a high level to a low level. Therefore, if the output signal level of the temperature sensor is high, then the control circuit 53 determines that the intake air temperature has not reached the predetermined level, and at the step 102, selects the open loop control. If the output signal level of the temperature sensor 64 is low, then the control circuit 53 determines that the intake air temperature is above the predetermined level, and selects the feedback control of the air/fuel ratio at a step 104.

Then, the feedback control operation will be explained hereinafter.

At first, the output signal level of the oxygen sensor 54 is read-in at a step 111. After read-in, the air/fuel ratio of the mixture is determined from the voltage level $VO_2$ at a step 112. In this determination step, whether the air/fuel ratio is rich or lean is determined by comparing the output voltage $VO_2$ of the oxygen sensor 54 with a reference voltage Vr which corresponds to a stoichiometric air/fuel ratio. If $VO_2 < Vr$, the air/fuel ratio is determined to be lean, and a lean signal is applied to the drive circuits 51 and 52 to shift the air/fuel ratio to the rich side, at a step 113. On the other hand, if $VO_2 \leq Vr$, the air/fuel ratio is determined to be rich, and a rich signal is applied to the drive circuits 51 and 52 to shift the air/fuel ratio to the lean side, at a step 114. It is to be noted, that the above mentioned activation detection voltage Vx may be of the same voltage as the reference voltage Vr.

In the case of the open loop control of the air/fuel ratio, the lean signal is applied to the drive circuits 51 and 52 to control the air/fuel ratio to the rich side regardless of the output signal voltage $VO_2$ of the oxygen sensor 54.

When the lean signal is applied, the drive circuits 51 and 52 deenergize the soleniods 15a and 18a to make the electro-magnetic valves 15 and 18 inactivated. Conversely, when the rich signal is applied, the drive circuits 51 and 52 energize the soleniods 15a and 18a to activate the electro-magnetic valves 15 and 18. During the period when the electro-magnetic valves 15 and 18 are inactivated, the air control passage 11a is closed by the electro-magnetic valve 15 and the electro-magnetic valve 18 closes the vacuum supply passage 17 and provides the communication between the part of the vacuum supply passage 17 of the side of the vacuum chamber 16a, and the atmospheric pressure supply passage 19. Therefore, the vacuum in the vacuum chamber 16a goes down and the valve element 16e of the air control valve 16 is displaced to close the valve, and consequently the air control passage 11b is also closed. During the closure of the air control passages 11a and 11b, the engine 4 is not supplied with the secondary air through the secondary air passage 11, and the air/fuel ratio of the mixture moves to the rich side.

When the control of the electro-magnetic valves 15 and 18 is changed to the activating state from the inactivating state, the electro-magnetic valve 15 immediately opens to lead the secondary air into the air control passage 11a, whose amount is proportional to the opening angle of the air control valve 12, that is, proportinal to the amount of the main intake air. At the same time, the electro-magnetic valve 18 makes the communication through the vacuum supply passage 17 and closes the passage to the atmospheric pressure supply passage 19, to supply the vacuum to the vacuum chamber 16a. With this operation, the vacuum in the vacuum chamber 16a gradually approaches to the value Pr, and the air control valve 16 is gradually opened to introduce the secondary air also into the air control passage 11b.

As the vacuum in the vacuum chamber 16a approaches to the vacuum Pr, the opening degree of the air control valve 16, i.e., the area of the section of the air control passage gradually increases to raise the amount of the secondary air. Therefore, the flows of the secondary air travelling through the air control passages 11a and 11b are added with each other and supplied to the engine 4 via the secondary air passage 11. Thus, the air/fuel ratio of the mixture is controlled to the lean side, and the amount of the secondary air supplied to the engine gradually increases with time.

After this, when the control of the electro-magnetic valves 15 and 18 is changed from the activation state to the inactivation state, the air control passage 11a is immediately closed by the closure of the electro-magnetic valve 15 and the electro-magnetic valve 18 closes the vacuum supply passage 17 as in the above and makes the communication between the part of the vacuum supply passage of the side of the vacuum chamber 16a and the atmospheric pressure supply passage 19. Therefore, the vacuum chamber 16a is supplied with the atmospheric pressure and the vacuum in the vacuum chamber 16a gradually approaches to the atmospheric pressure, and the amount of the secondary air decreases with the reduction in the area of the section of the air control passage 11b. Thus, after the closure of the air control passage 11a, the secondary air through the air control passage 11b is supplied to the engine 4 via the secondary air passage 11, and the amount of the secondary air through the air control passage 11b is reduced gradually.

Figure 5A:
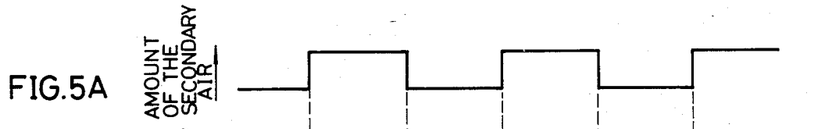
FIGS. 5A to 5C are diagrams showing the manner of controlling the amount of the secondary air in the air/fuel ratio control system of FIG. 2.
Figure 5B:
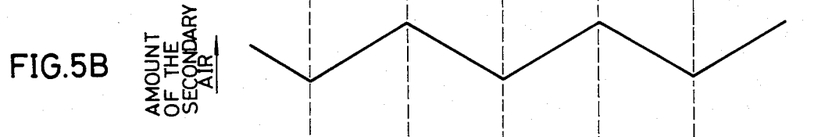
Figure 5C:
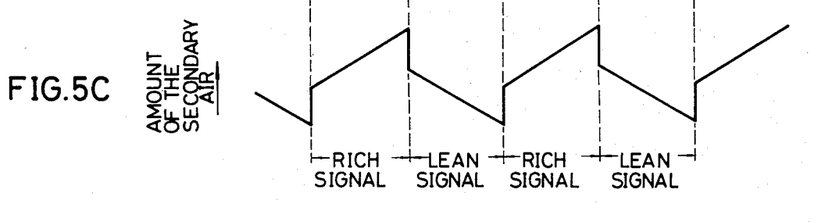

Accordingly, if the air/fuel ratio is to be controlled to a preselected air/fuel ratio, the rich signal and the lean signal are produced successively and alternately. Therefore, the secondary air flows intermittently through the air control passage 11a to effect a proportional (P) control of the secondary air, as shown in FIG. 5A. On the other hand, in the air control passage 11b, the amount of the secondary air increases upon presence of the rich signal and decreases upon presence of the lean signal to perform an integral (I) control of the secondary air, as shown in FIG. 5B. Therefore, the amount of the secondary air flowing through the secondary air passage 11 becomes equal to the sum between the proportionally controlled part and the integrally controlled part, as shown in FIG. 5C.

In addition, the control circuit 53 produces the lean signal and makes the electro-magnetic valves 15 and 18 inoperative, regardless of the output signal level of the oxygen sensor 54 during idling and deceleration of the engine 4.

The operational state of the engine is detected by means of a vacuum switch 66 to which the vacuum from the vacuum detection hole 8 is applied, and which is turned on to provide a high level output signal Va to the control cirucit 53 when the supplied vacuum is lower than a predetermined level, 60 mmHg for example.

Figure 6:
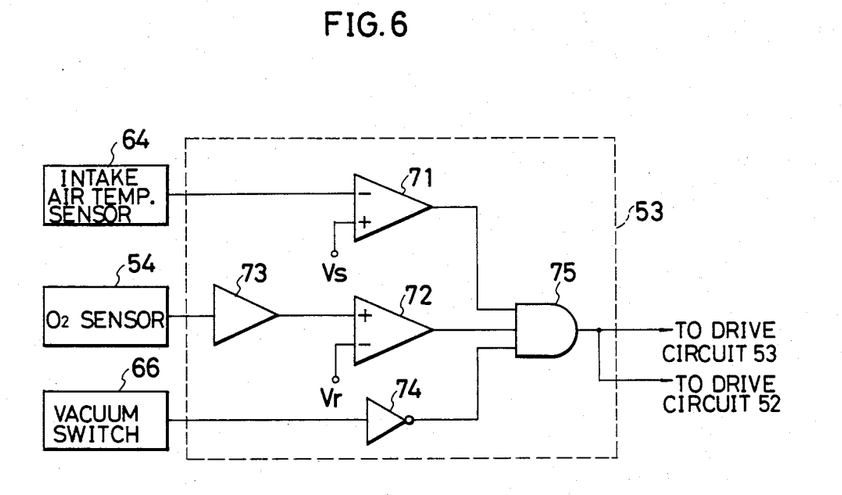
FIG. 6 is another example of the control circuit of FIG. 2.

Furthermore, as shown in FIG. 6, the control circuit 53 may consist of comparators 71 and 72, a buffer 73, an inverter 74, and an AND circuit 75 which as a whole, performs the same operation, instead of using the microcomputer. In FIG. 6, Vs denotes the threshold voltage level of the output signal of the intake air temperature sensor 64.

Thus, according to the air/fuel ratio control system of the present invention, since the start timing of the feedback control is determined in accordance with the temperature of the intake air, the operation of the engine is improved as compared with the conventional case in which the start timing of the feedback control is determined in accordance with the engine coolant temperature. Further, if an automatic choke valve is equipped to an engine having the above explained air/fuel ratio control system of the intake side secondary air induction type, it is preferable to select the opening angle of the choke valve at an intake air temperature at which the feedback control is started, to a level which does not increase the vacuum exceedingly. By this provision, the increase in the venturi vacuum after the initiation of the feedback control is prevented and the engine operation under such a condition can be improved.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

What is claimed is:

1. An air/fuel ratio control system for an internal combustion engine having an air induction system equipped with a choke valve, and an exhaust system, comprising:
    a secondary air passage communicated with an intake air passage of said air induction system, downstream of a throttle valve disposed in said intake air passage;
    a control vacuum generating means for generating a control vacuum by combining a vacuum around or downstream of said throttle valve with a vacuum of the inside of a venturi formed in said intake air passage;
    an air control valve disposed in said secondary air passage for varying a cross sectional are of said secondary air passage in response to said control vacuum;
    an oxygen sensor disposed in an exhaust passage of said exhaust system;
    a discrimination means for discriminating an air/fuel ratio on the basis of an output signal level of said oxygen sensor and producing an air/fuel ratio discrimination signal;
    an open/close valve disposed in said secondary air passage for opening and closing said secondary air passage in accordance with said air/fuel ratio discrimination signal;
    an intake air temperature sensor for detecting the temperature of an intake air of said engine and producing an intake air temperature signal; and
    a control means responsive to said intake air temperature signal, for preventing the supply of the secondary air through said secondary air passage when said intake air temperature is below a predetermined level.

2. An air/fuel ratio control system as set forth in claim 1, wherein said control means is connected to said open/close valve and causes to close said open/close valve without regard to said air/fuel ratio discrimination signal when said intake air temperature is below the predetermined level.

* * * * *